(12) United States Patent
Lanahan

(10) Patent No.: US 7,452,578 B2
(45) Date of Patent: Nov. 18, 2008

(54) STRUCTURAL FABRICS EMPLOYING ICOSAHEDRAL ELEMENTS AND USES THEREOF

(76) Inventor: Samuel J. Lanahan, 2045 NW. Johnson St., Portland, OR (US) 97209

( * ) Notice: Subject to any disclaimer, the term of this patent is extended or adjusted under 35 U.S.C. 154(b) by 593 days.

(21) Appl. No.: 10/932,403

(22) Filed: Sep. 1, 2004

(65) Prior Publication Data
US 2006/0160446 A1  Jul. 20, 2006

(51) Int. Cl.
 *B32B 1/00* (2006.01)
(52) U.S. Cl. .................... 428/36.1; 52/79.4; 52/81.1
(58) Field of Classification Search ........... 52/81, 52/79.4; 36/100; 428/36
See application file for complete search history.

(56) References Cited

U.S. PATENT DOCUMENTS

| | | | |
|---|---|---|---|
| 2,682,235 A | 6/1954 | Fuller | |
| 3,063,521 A | 11/1962 | Fuller | |
| 3,354,591 A | 11/1967 | Fuller | |
| 3,722,153 A | 3/1973 | Baer | |
| 3,866,366 A | 2/1975 | Fuller | |
| 3,953,948 A | 5/1976 | Hogan | |
| 3,970,301 A * | 7/1976 | Lehmann | 482/35 |
| 4,207,715 A | 6/1980 | Kitrick | |
| 4,719,726 A | 1/1988 | Bergman | |
| 5,524,396 A * | 6/1996 | Lalvani | 52/81.1 |
| 5,906,530 A * | 5/1999 | Lindsey | 446/85 |
| 6,379,212 B1 | 4/2002 | Miller | |
| 6,672,789 B2 * | 1/2004 | Chen | 403/171 |
| 2001/0016283 A1 * | 8/2001 | Shiraishi et al. | 429/218.2 |
| 2004/0155518 A1 * | 8/2004 | Schlanger | 301/58 |
| 2004/0158999 A1 * | 8/2004 | Trantow | 33/452 |

OTHER PUBLICATIONS

Fuller, E.B., "Tensegrity," *Synergetics*, pp. 428-431 (1975).
Pearce, Peter, Structure in Nature is a Strategy for Design, Ch.11, "Infinite Spatial Networks from Equilateral Triangles," pp. 144-153 (1978).
International Search Report and Written Opinion for PCT/US05/31145.

* cited by examiner

*Primary Examiner*—Callie E Shosho
*Assistant Examiner*—Erik Kashnikow
(74) *Attorney, Agent, or Firm*—Klarquist Sparkman, LLP

(57) ABSTRACT

A structural fabric comprises a plurality of discrete and spaced apart icosahedral elements and a plurality of interconnecting elements. The icosahedra elements are interconnected at selected edges by the interconnecting elements in tension so as to form a self-supported array of the icosahedral elements. The icosahedral elements may be icosahedrons (20 sides) or truncated icosahedrons (32 sides). Methods of constructing the structural fabric are also disclosed.

45 Claims, 14 Drawing Sheets

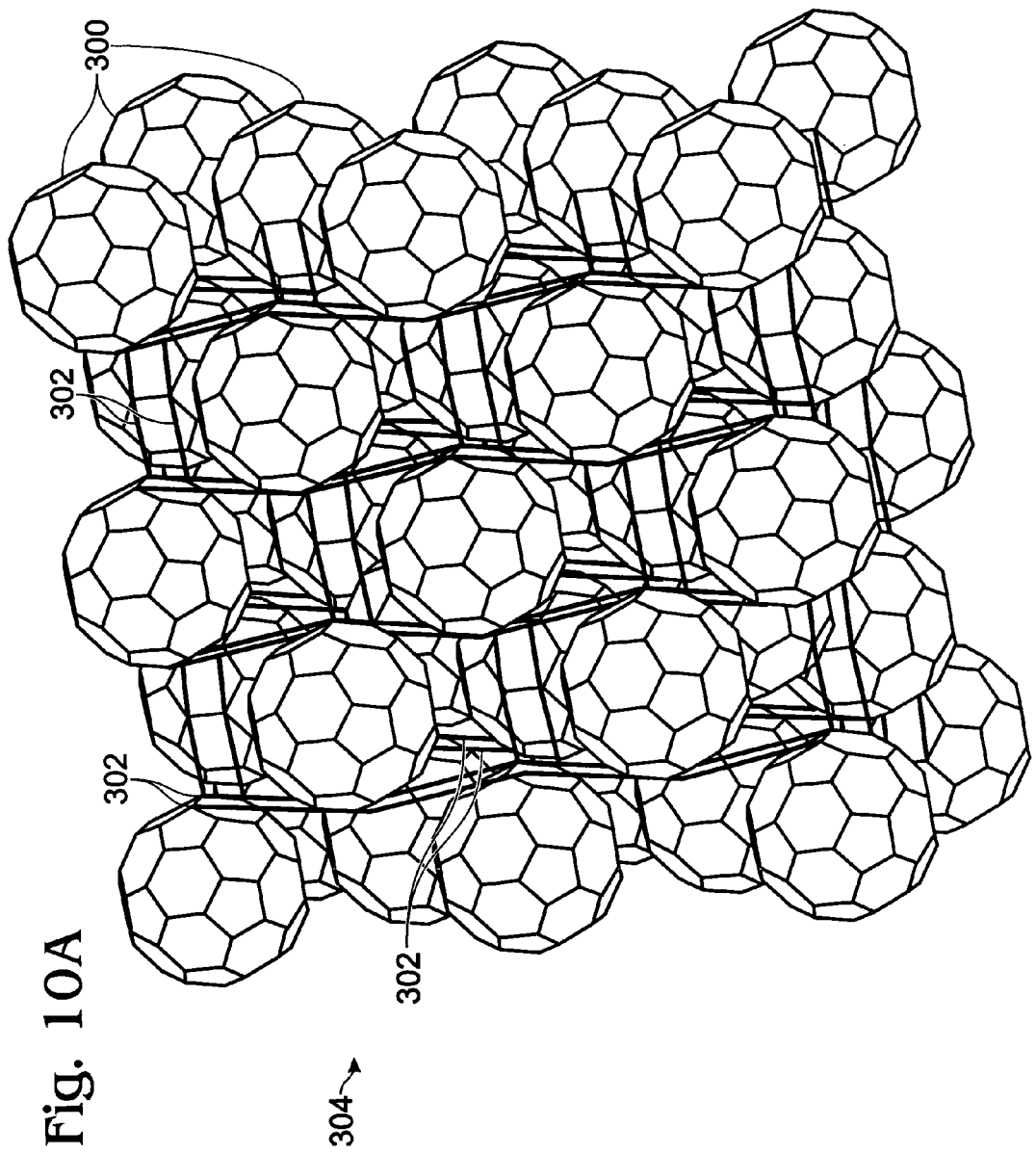

STRUCTURAL FABRICS EMPLOYING ICOSAHEDRAL ELEMENTS AND USES THEREOF

FIELD OF THE INVENTION

This invention relates to novel structural materials and uses thereof. More particularly, the invention relates to a tensegrity structure which employs icosahedral elements as compression members so as to produce omni directional structural fabrics.

BACKGROUND

Any useful physical structure, device or material (hereinafter "structure") must be adapted so that the structure can withstand the forces that are applied to the structure. In building architecture it is often a structural design principle to provide the greatest strength for the least size or weight as is practical. If followed, this principle can enable structures to be larger, more economical and more aesthetically pleasing.

The same principle is often useful in the design of materials used in a wide variety of applications other than buildings. Achieving a high strength-to-weight ratio is also important in the design of materials for aircraft, other vehicles, and almost any portable or movable object.

A leap forward in structural design was made in the early 1950's by Buckminster Fuller who invented what is commonly known as the geodesic dome, described in U. S. Pat. No. 2,682,235. Fuller showed how one could obtain a high strength-to-weight ratio in a domed structure through the orderly subdivision of the twenty equilateral spherical triangles of the icosahedron by arcs of great circles of the basic sphere, and interconnecting a plurality of struts representing the sides of the triangles that result from that subdivision. Due to the stable nature of triangular structures in response to stress, and assuming that the elastic limit of the strut material is not exceeded, the structure is able to support both itself and a relatively large load compared to its weight, and to provide a small ratio of structural weight-to-area covered, and volume enclosed, by the structure.

In the '235 patent, Fuller also described how, by employing two concentric, virtual spherical surfaces and forming tripods, or tetrahedral units, between them, one-half the struts could be replaced by tensional (hereunder "tension") members such as wires or cables, the remaining struts ordinarily being in compression. Thus, Fuller introduced the idea of balancing the forces on interconnected, columnar compression members with interconnected, flexible tension members to produce a high strength-to-weight ratio truss forming a domed structure.

Later, Fuller introduced the idea of "tensegrity" (a combination of "tensile" and "integrity"), as described in his U.S. Pat. No. 3,063,521. Here, he showed that an even greater strength-to-weight ratio can be achieved by disconnecting the compression members from one another and eliminating more of them, the compression members being entirely interconnected by tension members. He referred to the remaining compression members as "discontinuous compression columns" because no compression force is transmitted directly from one column to another as they "float in a sea of tension elements." Column 3, lines 57-59. He also showed how a basic three-strut tensegrity unit can be used to construct the geodesic dome for which he is well known.

In U.S. Pat. No. 3,354,591, Fuller extended his ideas to octahedral tensegrity modules whose edges are defined by tension members attached to the ends of interior compression members. The modules were joined face-to-face to produce a building truss. However, as pointed out by Kitrick in his U.S. Pat. No. 4,207,715, when the octahedral modules are so joined, the adjoining tension elements become redundant and one of each pair of such tension elements can be eliminated. This reduces the ratio of tension to compression-elements, which may be undesirable.

Kitrick suggests using any of octahedral, tetrahedral, or icosahedral modules, but adjoining the adjacent triangular faces in overlapping but inverse relation. Thus, Kitrick sought to eliminate the redundancy of tension elements, which might be advantageous in some circumstances, while adhering to the concept of columnar compression members discontinuously interconnected by tension members. At the same time, whether such a structure should be characterized as exhibiting tensegrity, because it lacks continuous tension, and second whether icosahedrons can effectively be arranged in the manner suggested.

Of the five regular Platonic polyhedra, namely the tetrahedron (4 equilateral triangles, 6 edges and 4 vertices), the cube (6 squares, 12 edges and 8 vertices), the octahedron (8 equilateral triangles, 12 edges and 6 vertices), the dodecahedron (12 regular pentagons, 30 edges and 20 vertices), and the icosahedron (20 equilateral triangles, 30 edges and 12 vertices), the dodecahedron and the icosahedron are the most complex and, unlike the other three, have five-fold symmetry. Nonetheless, the icosahedron, three pairs of whose faces may be arranged to be parallel to one another, has inspired various structures. As already mentioned, a spherical icosahedron was the starting point for the geodesic dome. Also Kitrick endeavored seemingly unsuccessfully to describe a structure made of icosahedral tensegrity modules.

In addition, Baer U.S. Pat. No. 3,722,153 and Hogan U.S. Pat. No. 3,953,948 disclose truss systems based on the icosahedron, and interleaved construction elements based on various polyhedrons, including the icosahedrons. However, none of these suggests the use of the tensegrity concept.

Characteristics of structural materials in addition to their strength-to-weight ratio may also be important to a particular application. Such characteristics may include, for example, optical, acoustical, electrical and chemical properties. While these properties may simply derive from the substance of which a structural material is made, they may also derive from a geometry, or a combination of substance and geometry. For example, much attention has been given to the potential of the carbon-60 molecule (commonly known as the "Buckyball") due to its unusual geometry that may have unique useful properties, but the molecule so far mainly appears to have been a subject of scientific curiosity and research.

The afore-described works of Fuller on tensegrity structures, while groundbreaking and visionary, and the work of Kitrick, were confined in their scope to the use of columnar compression members in tensegrity structures used in building architecture. In addition, the Fuller structures are based on spherical symmetry, which does not lend itself well to fabricating structures with Cartesian or orthonormal symmetry. While the structures described by Kitrick are better adapted to fabricate structures with Cartesian symmetry, it turns out that they do not maximize the strength-to-weight ratio and are not readily scalable. Nor do any of these disclosures explore other properties that may be important, particularly in structural materials for applications other than building architecture.

SUMMARY OF THE INVENTION

The present invention provides a structural fabric, comprising a plurality of icosahedral elements, and a plurality of interconnecting elements, the icosohedral elements being interconnected by the interconnecting elements in tension so as to form an array of the icosahedral elements. A first interconnecting element may extend, on average, along a first Cartesian axis; a second interconnecting element may extend, on average, along a second Cartesian axis; and a third interconnecting element may extend, on average, along a third Cartesian axis. The icosahedral elements may be icoshadrons, particularly regular icosahedrons, or truncated icosahedrons, particularly semi-regular icosahedrons. The interconnecting elements preferably, but not necessarily, are filaments or ribbons. A method for constructing a structural fabric is also provided, comprising providing a plurality of icosahedral elements, and interconnecting the icosahedral elements by a plurality of interconnecting elements in tension so as to form an array of said icosahedral elements.

It is to be understood that this summary is provided as a means of generally determining what follows in the drawings and detailed description and is not intended to limit the scope of the invention. Objects, features and advantages of the invention will be more readily understood upon consideration of the following detailed description taken in conjunction with the accompanying drawings.

BRIEF DESCRIPTION OF THE DRAWINGS

FIG. 2B is a diagram of the triangle of FIG. 2A showing applied and resultant forces.

FIG. 10A is a perspective view of a third preferred embodiment of a structural fabric according to the present invention.

DETAILED DESCRIPTION OF THE INVENTION

Structural Integrity

Figure 1A:
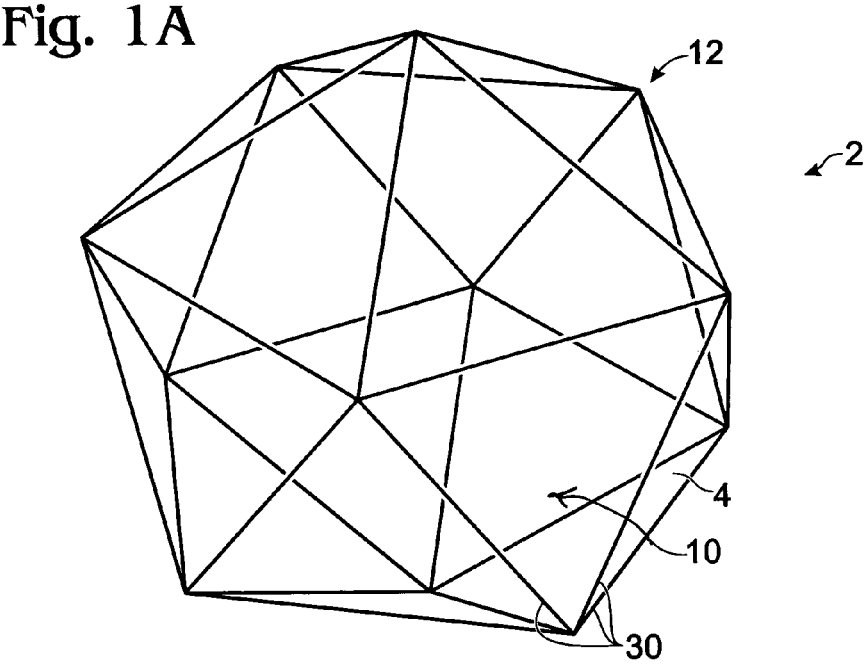
FIG. 1A is a perspective view of an open regular icosahedron.
Figure 1B:
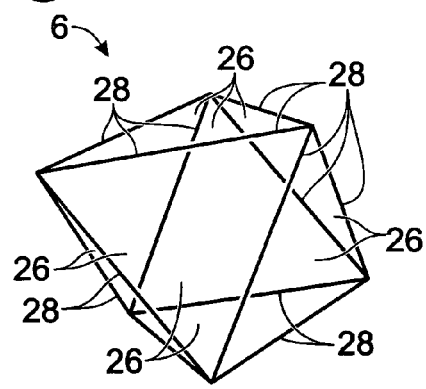
FIG. 1B is a perspective view of an open regular octahedron.

FIG. 1A shows an icosahedron 2. The icosahedron 2 has twenty equilateral triangles 4. An icosahedron, which is one of the five regular Platonic polyhedrons, shares the property with the octahedron 6 of FIG. 1B and the tetrahedron 8 of FIG. 1C that it can be formed in a stable configuration simply by connecting elongate members 10, such as rods, together at ideal pin joints 12. Ideal pin joints do not resist rotation of the elongate members to which they connect and, generally, most alternative geometric configurations formed using pin joints are not stable. For example, the cube shown in FIG. 1D can be made to adopt the configuration of FIG. 1E if the force indicated as F is applied.

The configuration stability, or structural integrity, of an icosahedron can be better understood by considering the structural integrity of the triangular sides of which it is composed.

Figure 2A:
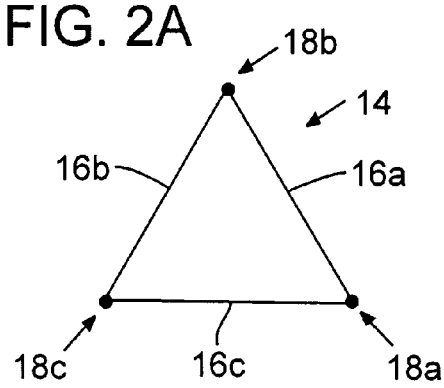
FIG. 2A is an illustration of an equilateral triangle.

FIG. 2A shows a simple unloaded triangle 14. The triangle 14 includes three elongate members 16a, 16b, and 16c connected to each other through respective pin joints 18a, 18b, and 18c. The pin joints 18a, 18b, 18c, do not resist rotation of the elongate members 16a, 16b, 16c. For example, if the pin joint 18b is removed, the elongate members 18a and 18b can both rotate about the remaining pin joints 18a and 18c, respectively. The triangle 14 would fall apart.

Figure 3B:
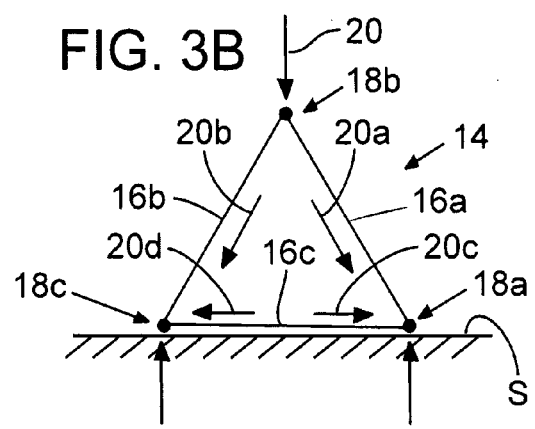
FIG. 3 is a perspective view of an open truncated regular icosahedron.

FIG. 3B shows the triangle 14 with a load represented by a vector 20, applied to the pin joint 18b. The joints 18a and 18c rest on a frictionless surface S that supports the triangle. The load vector 20 resolves into vector pairs 20a, 20b and 20c, 20d. The vectors 20a and 20b are compressive loads applied to the elongate members 16a and 16b respectively. The vectors 20c and 20d are tensile loads applied to the remaining elongate member 16c. Since the elongate members can resist both tension and compression and no torques are applied to the elongate members, the triangle remains in a stable configuration.

Although the load vector 20 in this example is applied so that the vector pairs are identical, in general the load 20 can be applied to the triangle in any direction and the triangle will maintain its configuration. This structural integrity is achieved with a minimum use of material and is highly advantageous for use whenever strength and economy are important.

Figure 1C:
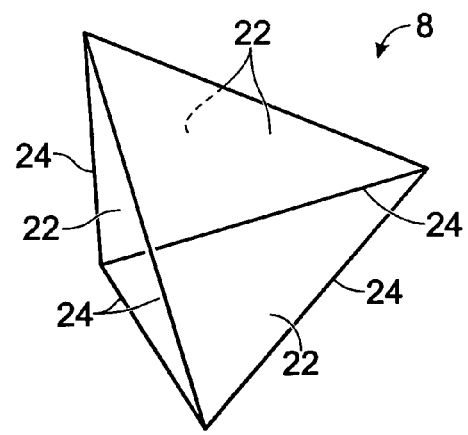
FIG. 1C is a perspective view of an open regular tetrahedron.
Figure 1D:
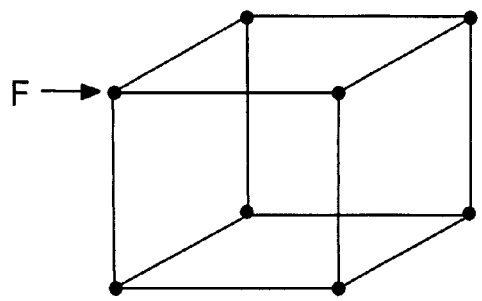
FIG. 1D is a perspective view of a cube in a first configuration.
Figure 1E:
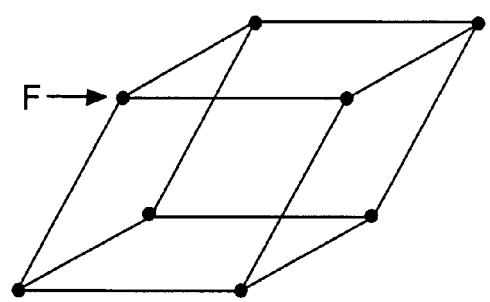
FIG. 1E is a perspective view of the cube of FIG. 1D in a second configuration, illustrating the instability of the configuration of the cube.

A tetrahedron, shown in FIG. 1C, has four equilateral triangles 22, six edges 24 and four vertices. It possesses the same structural integrity as the triangle 14, but in three dimensions. Similarly, an octahedron 8, shown in FIG. 1B, has eight equilateral triangles 26, twelve edges 28 and six vertices. It also possesses the same structural integrity as the triangle 14. Referring back to FIG. 1A, the icosahedron 12 is the next most complex regular polyhedron having the structural integrity of the triangle 14. The icosahedron has twenty equilateral triangles 4, thirty edges 30, and twelve vertices.

Figure 3:
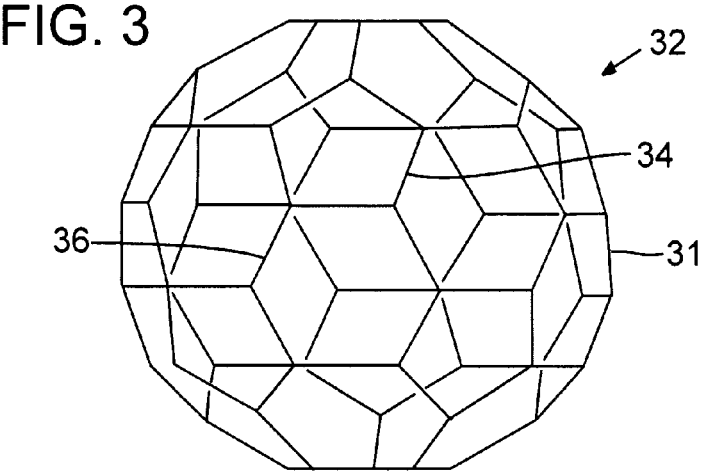

A structure which is derived from the icosahedron and which shares its stability is the truncated icosahedron 32, shown in FIG. 3. in its open or "transparent" form. The truncated icosahedron is derived from the icosahedron by "slicing off" the vertices of the icosahedron so as to form twelve identical pentagons 34. The truncated regular icosahedron has twelve regular pentagons 34, twenty regular hexagons 36, ninety edges and sixty vertices. The pentagons provide a plurality of parallel surfaces.

An infinite number of larger three-dimensional structures formed of pluralities of triangular units can be made (though, except for the dodecahedron, they will not be regular), in the limit approaching the configuration of a sphere. However, the structural integrity provided by the triangular shaped faces is lost to an ever greater extent as adjacent faces approach coplanarity.

It should be understood that, while the icosahedron is stable in configuration even though connected at pivotal joints, and therefore provides outstanding structural integrity, it is not necessary that the joints be pivotal. The elongate elements can be rigidly connected to each other if desired, for example, by being welded together or by being welded to intermediate structures such as plates that are joined together to further increase rigidity in a practical application without departing from the principles of the invention.

Icosahedrons

As mentioned above, the invention, or inventions, to which this description applies employ, at least in part, a plurality of icosahedral elements that are interconnected together. The icosahedral elements may be icosahedrons or truncated icosahedrons. In the regular icosahedron, all of the faces are equilateral triangles of equal size. The icosahedron shown in FIG. 1A is a regular icosahedron.

The truncated icosahedron shown in FIG. 3 is a semi-regular polyhedron, as it has twelve regular pentagons and twenty regular hexagons. The carbon-60 molecule possesses this geometry, and is often referred to as a "Buckyball" or "fullerene," in acknowledgement of Buckminster Fuller.

Figure 4:
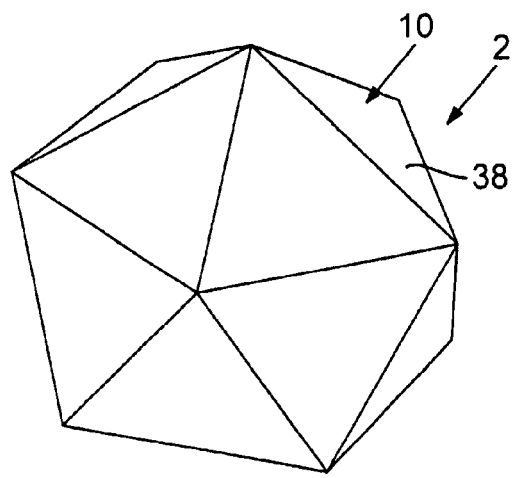
FIG. 4 is a perspective view of a closed regular icosahedron.
Figure 5:
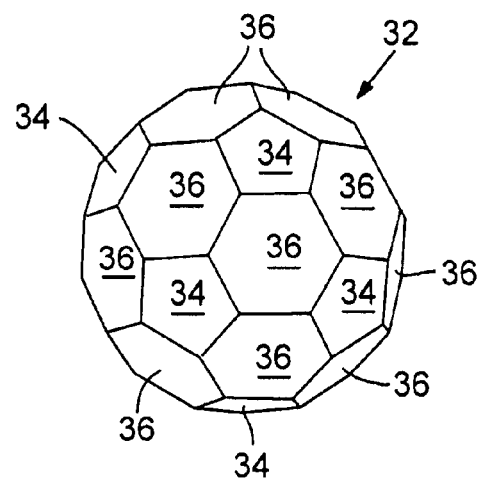
FIG. 5 is a perspective view of a closed truncated regular icosahedron.

Edges 30 of the regular icosahedron (FIG. 1A) and edges 31 of the truncated icosahedron (FIG. 3) are formed by elongate members connected together at vertices of the structure. The triangles 10 may be open as shown in FIG. 1A, or closed as shown in FIG. 4, where the triangles comprise either equilateral triangular sheets 38 or the faces of a solid prism.

Tensegrity Structures of Icosahedral Elements

Applicant has recognized that the regular icosahedron and truncated icosahedron, which semi-regular, provide an important balance between achieving structural integrity and constructing useful structures ("fabric" defined later). These forms provide structural integrity with a minimum use of materials, providing a high strength-to-weight ratio and corresponding structural efficiency. They also define edges and planes lying in orthogonal Cartesian planes, so that three dimensional lattice structures can be formed that have the standard Cartesian symmetry that is most useful in many applications.

Figure 6A:
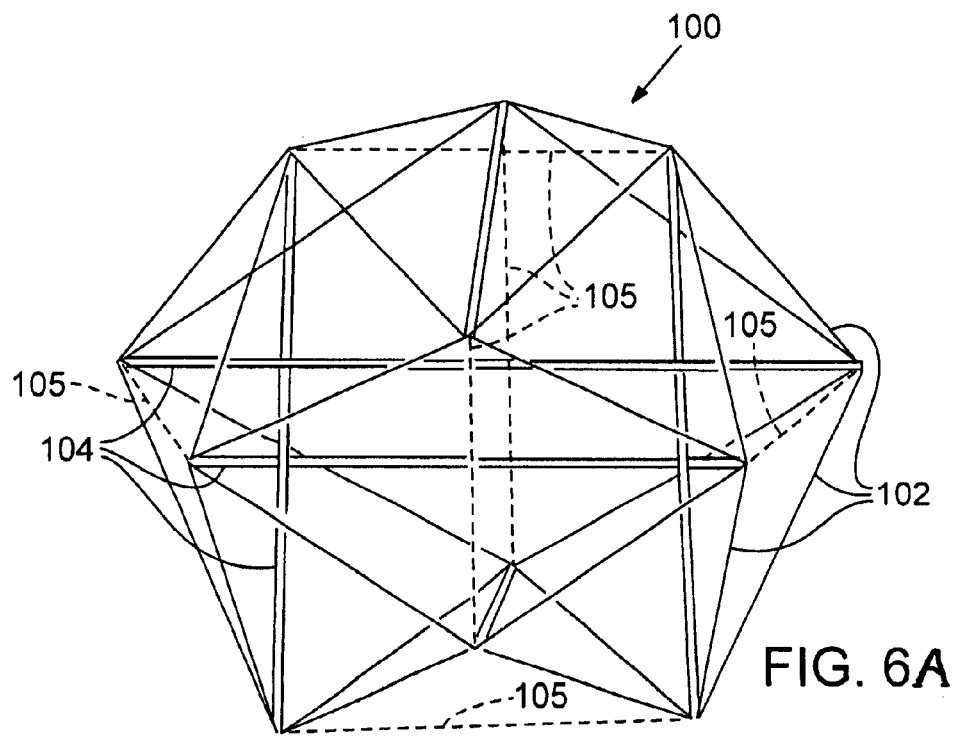
FIG. 6A is a perspective view of an open regular tensegrity icosahedron having six virtual edges.
Figure 12:
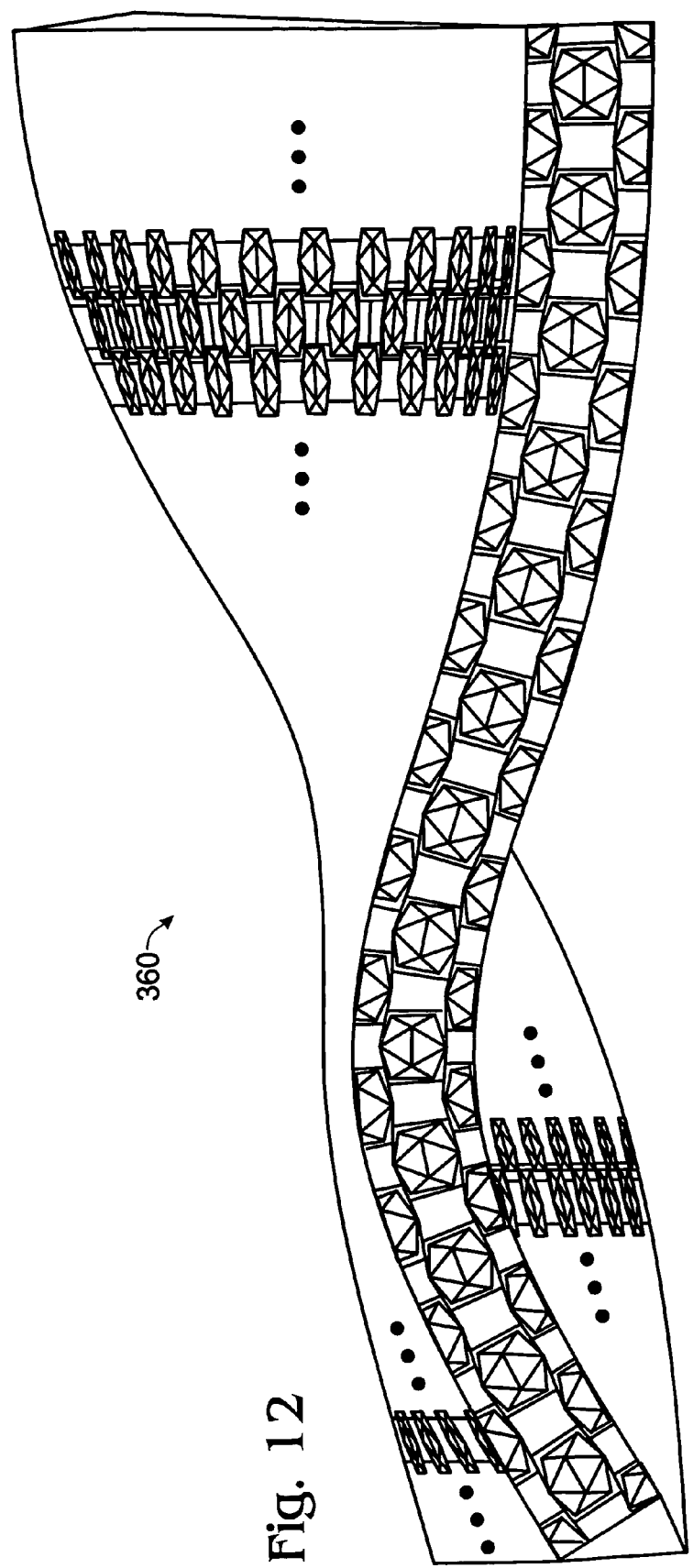
FIG. 12 is a perspective view of a non-conformal sheet of fabric according to the present invention.

Referring to FIG. 6A, it can be seen that a regular open icosahedron 100, with six virtual edges 105, can be formed as a tensegrity structure. That is, the real edges 102 of the icosahedron are tension members, such as strings. The tension elements apply compressive forces to elongate compression elements 104, such as rods. This is the type of tensegrity structure envisioned by others such as Fuller and Kitrick, as shown by FIG. 12 of the Kitrick patent. That is, they use elongate, columnar compression elements, and employ more tension elements than compression elements to provide "compression in a sea of tension." Such tensegrity elements are typically used to form trusses for structures having spherical symmetry.

Figure 6B:
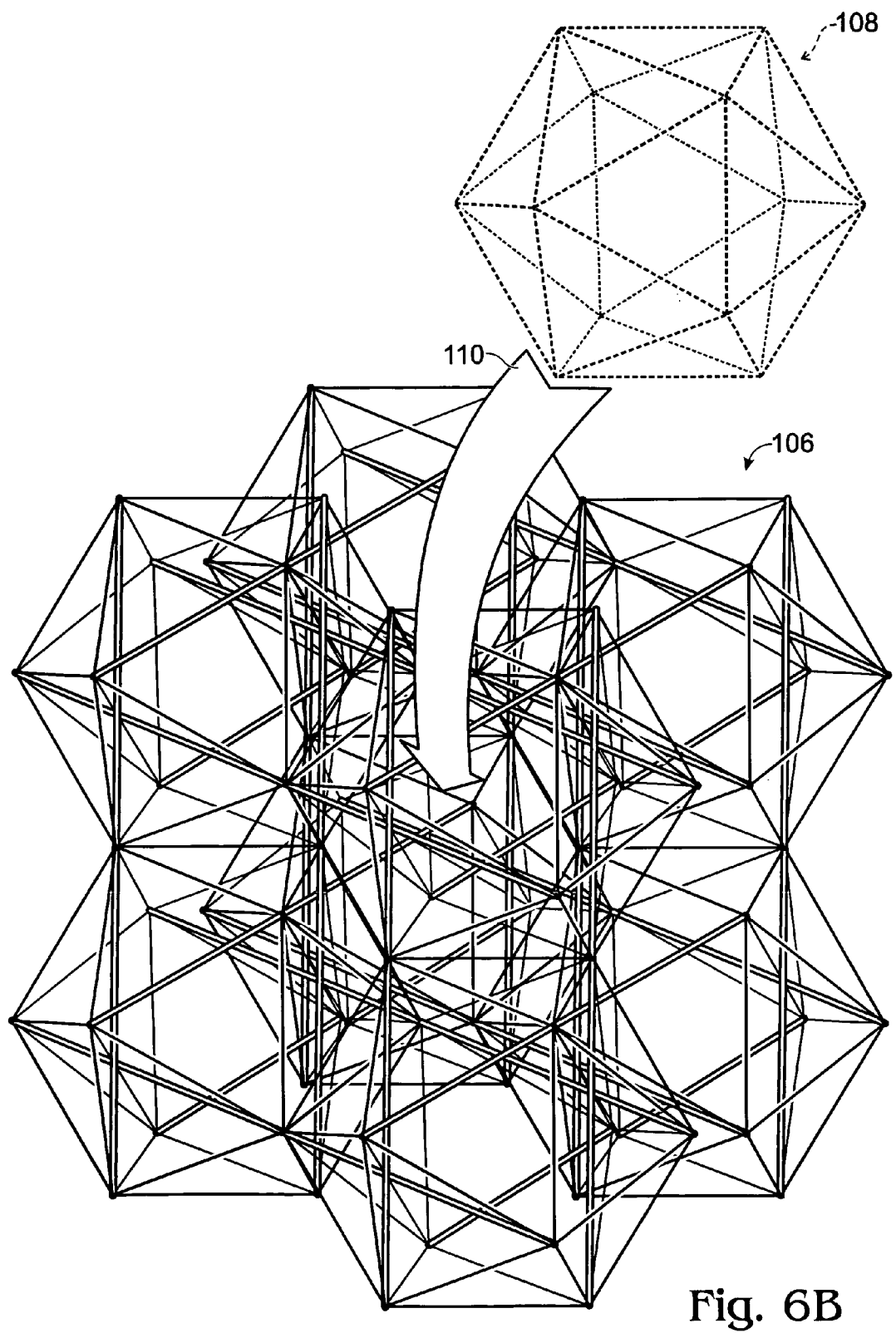
FIG. 6B is a perspective view of a set of four octahedrons of the type shown by FIG. 6A arranged in a regular array, and a virtual icosahedron.
Figure 6C:
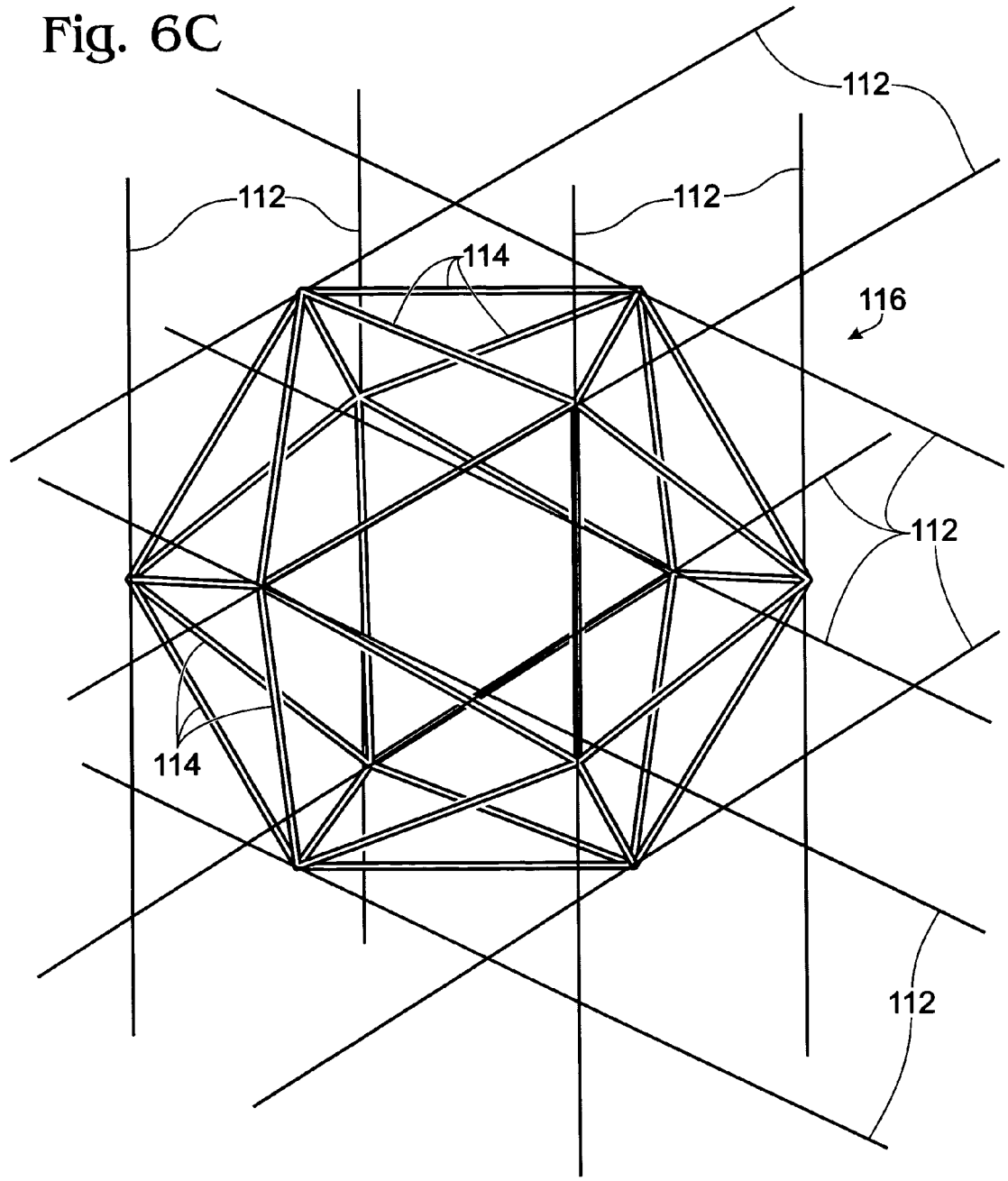
FIG. 6C is a perspective view of the inner portion of the mirror image of FIG. 6B, showing the basic icosahedral tensegrity unit of the present invention.

Applicant has observed that when a minimum of eight such tensegrity icosahedrons are arranged in a regular array 106, as shown in FIG. 6B, the tension members of the eight icosahedrons form an interior volume that is an icosahedron whose edges are all tension members and whose volume is empty. Thus, the virtual icosahedron 108 fits into the center of array 106, as shown by arrow 110. Moreover, contrary to the conventional wisdom, Applicant has discovered that, by substituting compression members for tension members and vice versa, as shown in FIG. 6C, a tensegrity structure can be formed wherein the number of tension members (twelve) 112 is less than the number of compression members (thirty) 114 for each tensegrity unit 116, yet the strength-to-weight ratio is improved.

According to the invention, interconnecting elements are used as tension members to tie icosahedral elements together along at least two and preferably three Cartesian coordinate axes. The icosahedral elements are formed of compression members. The material of which the compression members are formed is preferably relatively rigid, though it could be somewhat flexible without departing form the principles of the invention. The material of which the interconnecting elements are formed is preferably relatively flexible, though it could be rigid without departing from the principles of the invention.

Structural Fabrics of Icosahedral Elements

The term "structural fabric" or "fabric" is used herein in its broadest sense to refer to a structure that may be essentially entirely rigid, essentially entirely flexible, or may have any combination of rigidity and flexibility. This is intended to include, without limitation, architectural structures, nano-structures such as for electromagnetic devices, materials for protective clothing, and the like.

Figure 7A:
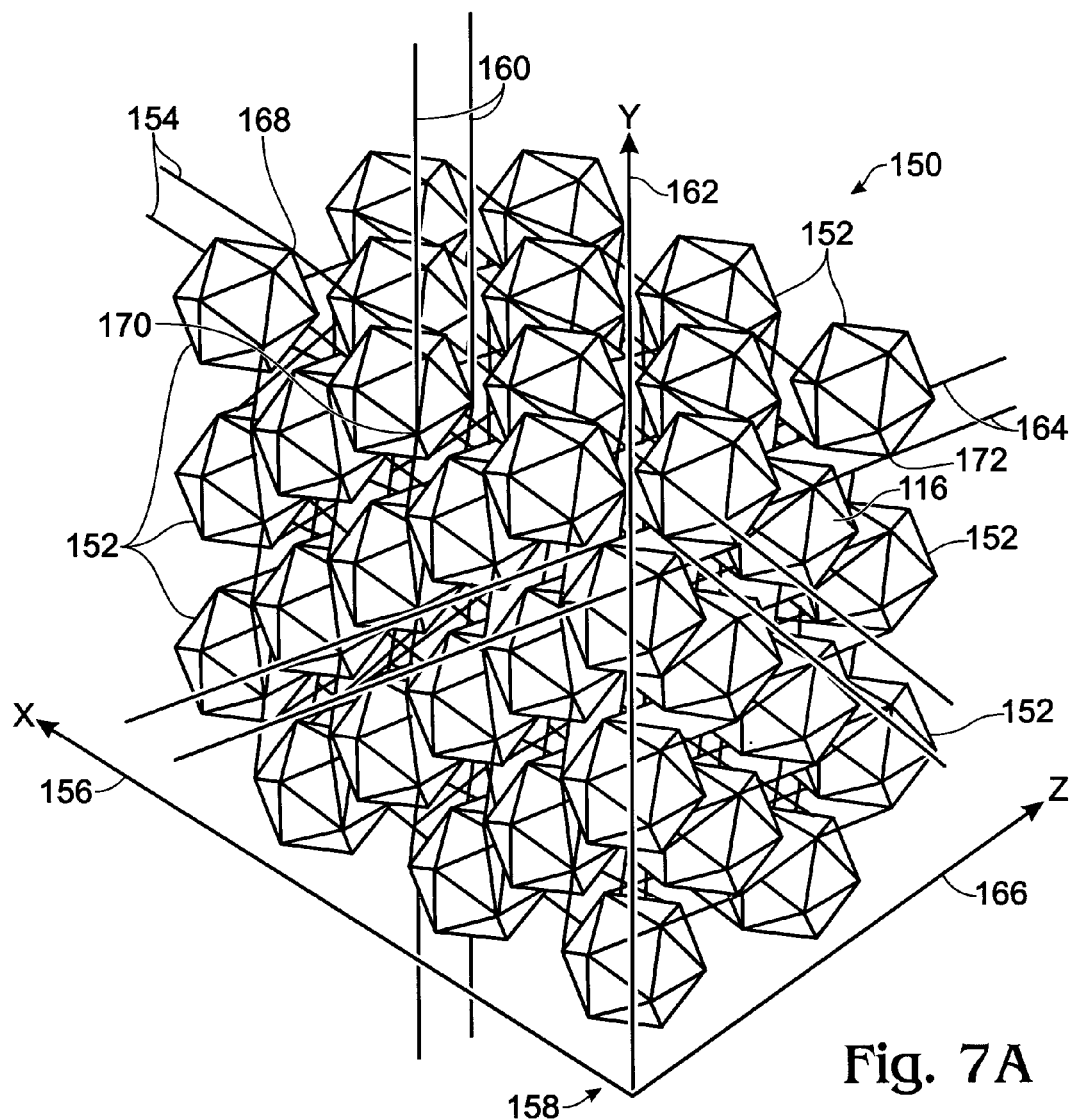
FIG. 7A is a perspective view of a first preferred embodiment of a structural fabric according to the present invention.

A first preferred embodiment of a structural fabric 150 according to the present invention is shown in FIG. 7A. In this fabric, a plurality of icosahedrons 152 are interconnected by filaments 154 in the "x" dimension 156 of a Cartesian coordinate system 158, filaments 160 in the "y" dimension 162 of the coordinate system, and filaments 164 in the "z" dimension 166 of the coordinate system. The filaments are attached to the icosahedrons at respective corresponding vertices 168, 170 and 172 thereof. The icosahedrons may be closed, as shown in FIG. 7A, or they may be open, as previously explained. The filaments are string-like in configuration.

Figure 7B:
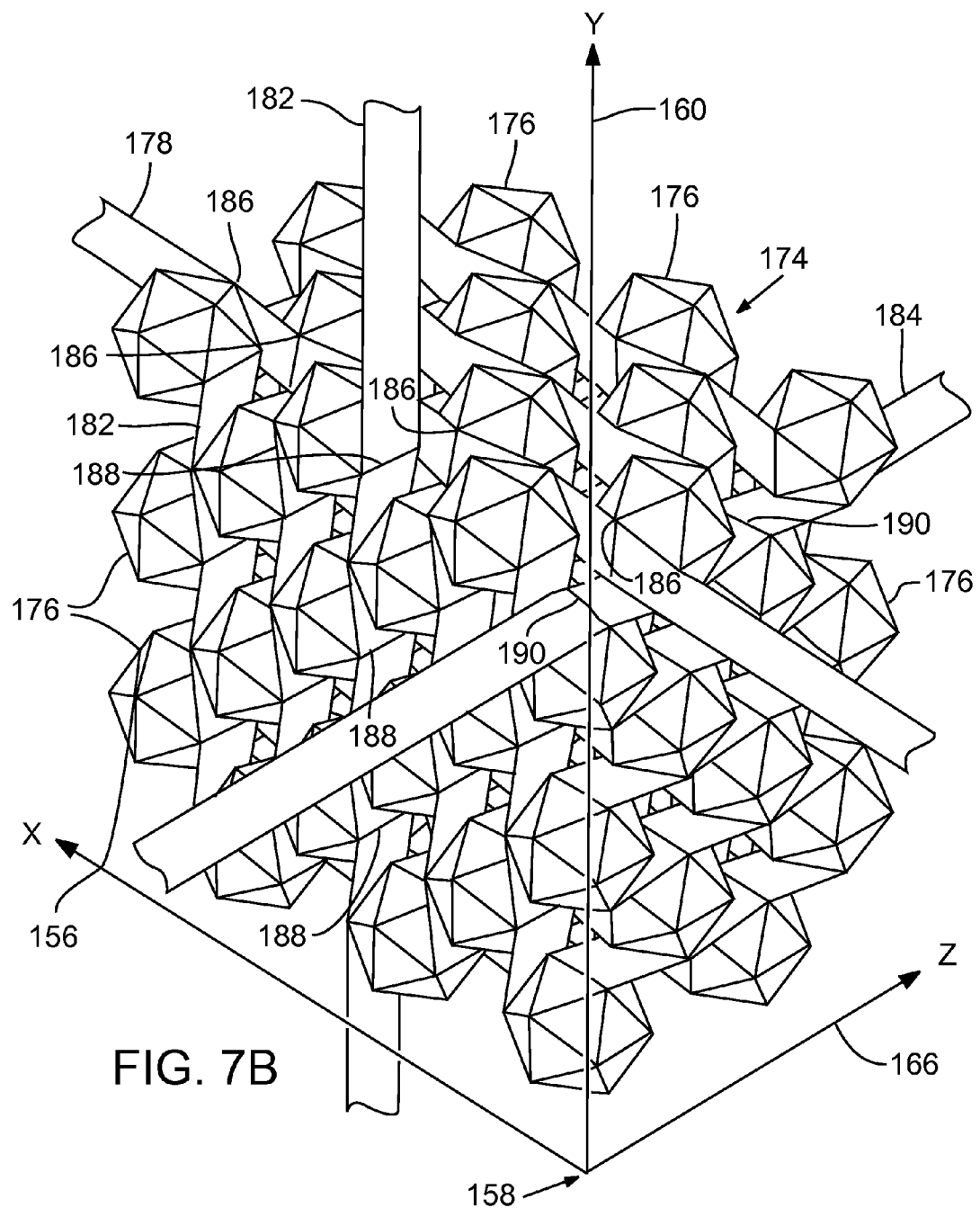
FIG. 7B is a perspective view of a second preferred embodiment of a structural fabric according to the present invention.

In a second preferred embodiment. 174, the structural fabric may comprise a plurality of icosahedrons 176 interconnected by ribbons, as shown in FIG. 7B. The ribbons are sheet-like in configuration. In this case, ribbons 178 lie in the x-y plane of the coordinate system 158, ribbons 182 lie in the y-z plane of the coordinate system, and ribbons 184 lie in the z-x plane of the coordinate system. The ribbons are connected to the icosahedrons at respective corresponding edges 186, 188 and 190 thereof.

In both the first embodiment 150 and the second embodiment 174 it is preferred that the icosahedral elements are arranged so that, in equilibrium, the filaments or ribbons, respectively, are pre-tensioned so as to experience a degree of tension throughout the fabric. Thus, while they extend, on average, along a linear axis or a plane, alternate sections of the interconnecting elements overlap the axis or plane in opposite directions. Put another way, they follow a zig-zag, or oscillating, path, as shown in FIGS. 7A and 7B.

Figure 8A:
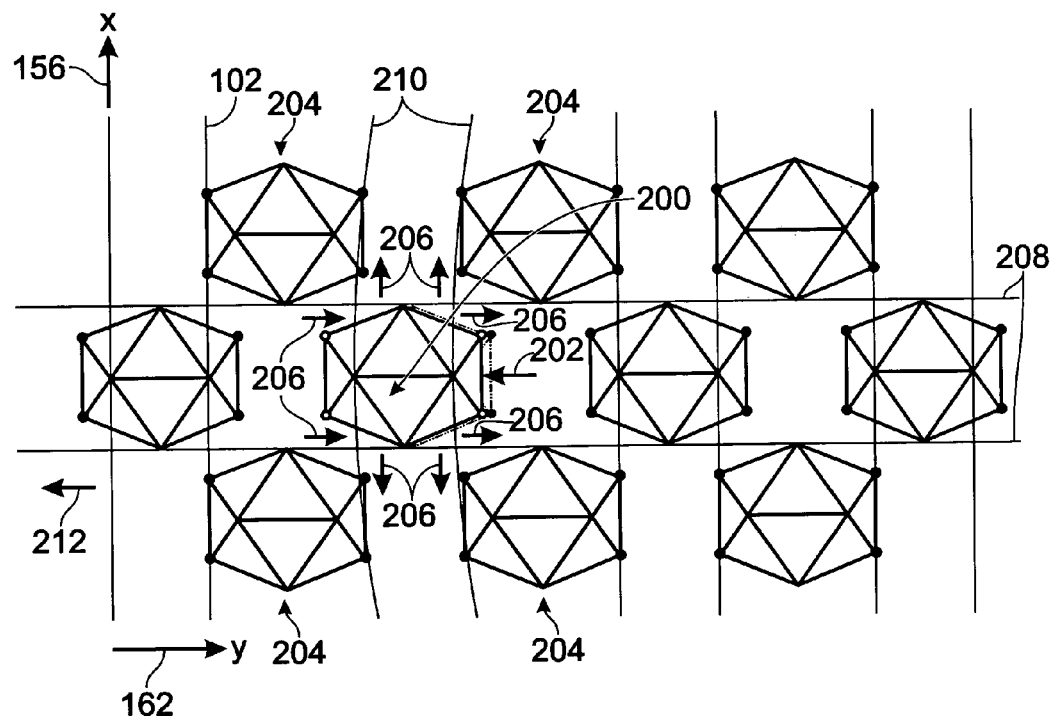
FIG. 8A is a diagram of the structural fabrics of FIG. 7A or 7B showing applied lateral and restoring forces.
Figure 8B:
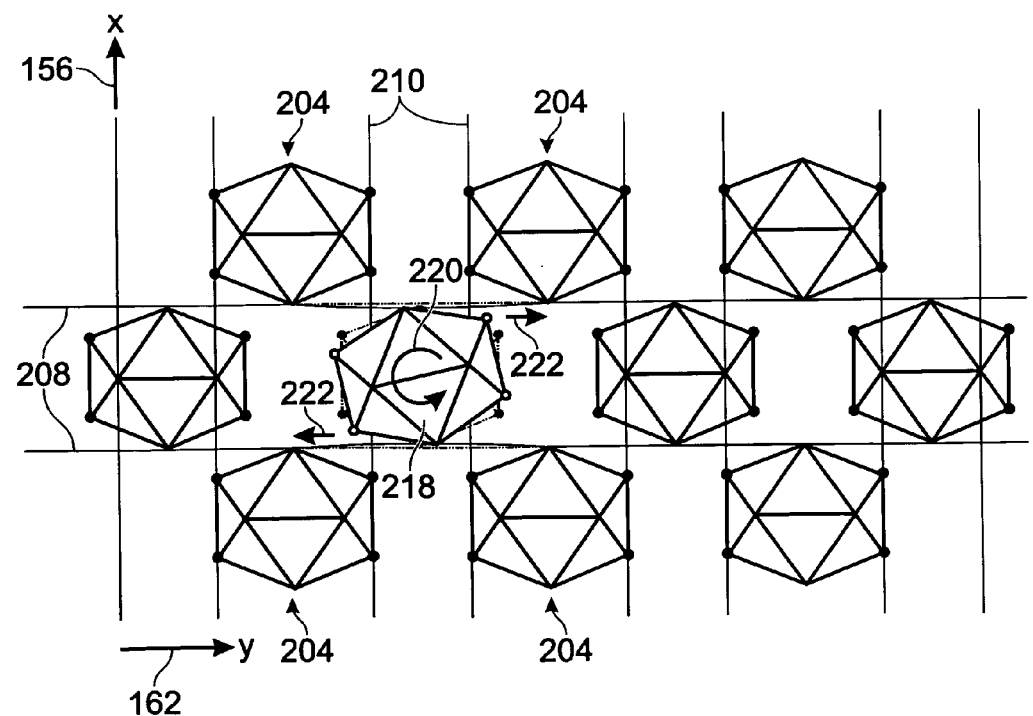
FIG. 8B is a diagram of the structural fabric of FIG. 7A or 7B showing applied torque and restoring torques.

It can be seen by reference to FIGS. 8A and 8B that the structural integrity of an icosahedron, or a truncated icosahedron, is transferred to the structural fabric constructed as in FIGS. 7A or 7B. In FIG. 8A, it can be seen that the force that tends to displace an icosahedron 200 in a structural fabric according to the present invention, as shown by vector 202, is resisted by the restoring forces of the other icosahedrons 204, as shown by the vectors 206. The forces corresponding to the vectors 206 are transmitted through the interconnecting members 208 and 210 which hold the icosahedrons together. While the force represented by vector 202 tends to displace the icosahedron to which it is applied in one direction 212, the interconnecting members in the two orthogonal directions 156 and 162 tend to hold the other icosahedrons in place, preventing relative displacement of the icosahedrons.

Similarly, in FIG. 8B it can be seen that torque that tends to rotate an icosahedron 218 in a structural fabric according to the present invention, as shown by arrow 220, is resisted by the restoring forces of the other icosahedrons, as shown by the vectors 222. The forces corresponding to the vectors 222 are transmitted through the interconnecting members that hold the icosahedrons together. While the torque tends to rotate the icosahedron, the other icosahedrons resist the rotation, preventing relative rotations of the icosahedrons.

Figure 9A:
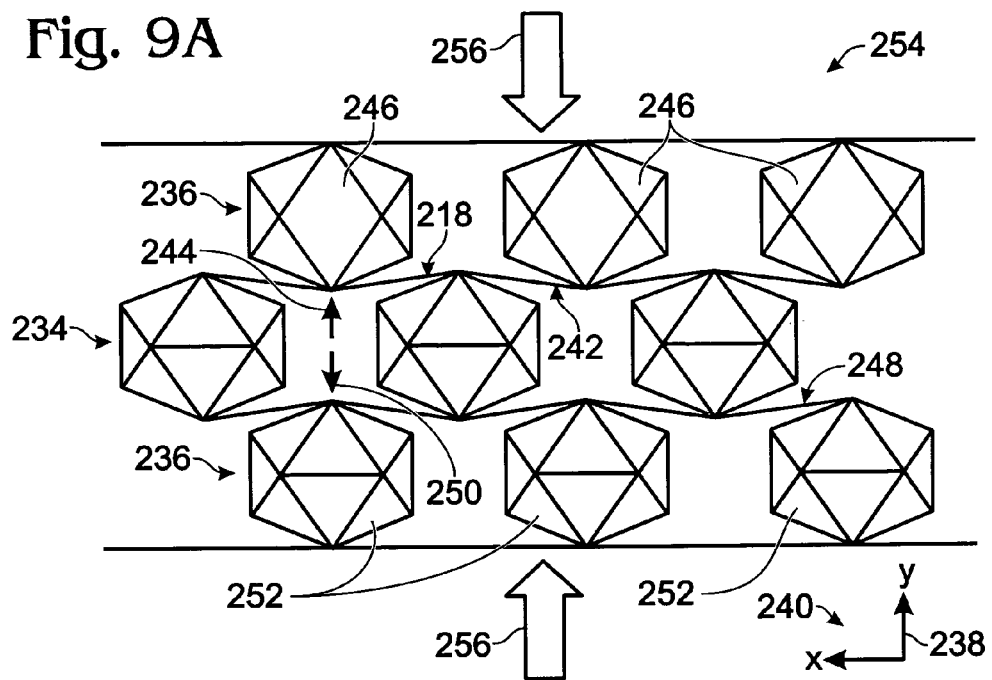
FIG. 9A is a diagram of the structural fabric of FIG. 7A shown in two dimensions, illustrating an applied compressive load and a preferred pre-tensioning of flexible interconnecting elements.

While the structures shown in FIGS. 8A and 8B show interconnecting elements that are linear, or planar, when the fabric is in equilibrium, as mentioned above it is preferred that the interconnecting elements be pre-tensioned, as shown in FIGS. 7A and 7B. This is seen more clearly in FIG. 9A and, showing the interconnecting members pre-tensioned by appropriate relative positioning of the icosahedrons 234 and 236, here in the "y" direction 238 of the coordinate system 240. Thence, the ribbon 242 exerts an upwardly directed force 244 on the icosahedrons 246 and the ribbon 248 exerts a downwardly directed force 250 on the icosahedrons 252 in an equilibrium state of the fabric 254. Additional compressive force 256 applied to the fabric is resisted by additional stretching of the interconnecting members.

Figure 9B:
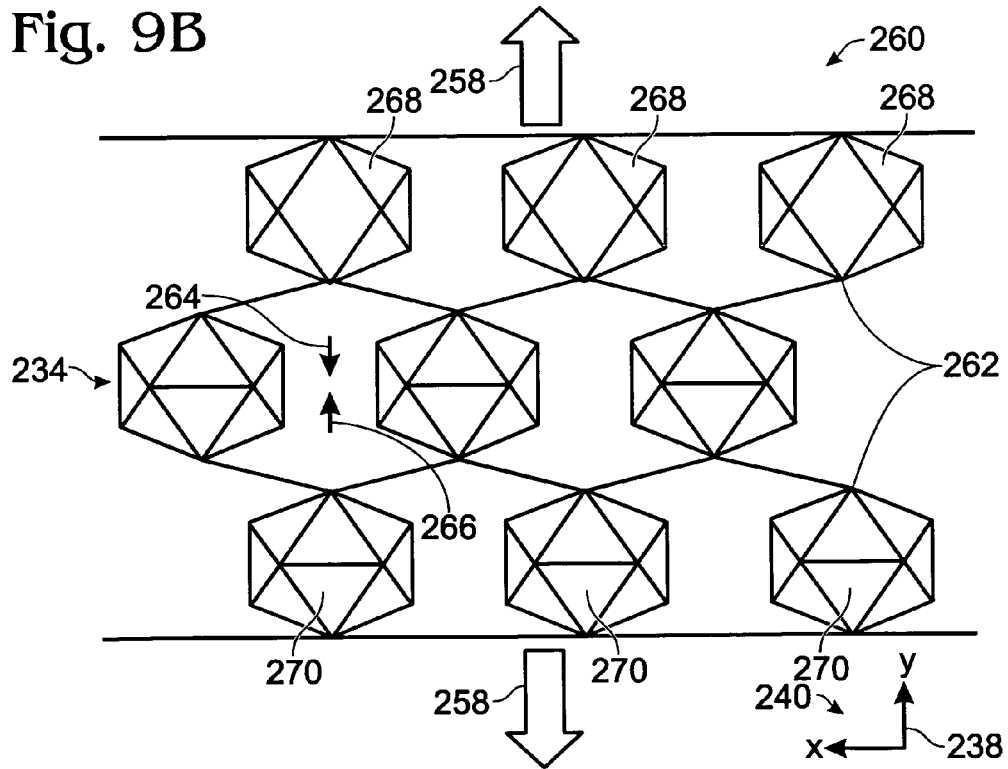
FIG. 9B is a diagram of the structural fabric of FIG. 7A, illustrating an applied tensile load with and a preferred pretensioning of rigid interconnecting elements.

As mentioned above, the invention contemplates that either the icosohedral elements may be relatively rigid as compared to the interconnecting members or the reverse. Referring to FIG. 9B, a tensile force 258 applied to the fabric 260 tends to pull the fabric apart along the "y" direction. Whether the interconnecting elements 262 are rigid or not, they will resist this pulling with forces 264 and 266 pulling back on the icosahedrons 268 and 270 respectively. However, where the interconnecting elements are sufficiently rigid, they may be pre-tensioned by being originally shaped or deformed to adopt the configuration shown.

It may be appreciated that the relative rigidities of the icosahedral elements and the interconnecting elements can be tailored for a given application. In addition, individual instances of the same type of element, e.g., the interconnecting elements, may be provided with varying rigidities to provide a desired anisotropy to the array. For example, the interconnecting elements extending in the "z" direction may be made less or more rigid than the interconnecting members in the "x" and "y" directions where the anticipated loading configuration differs in the "z" direction as compared to the "x" and "y" directions.

Figure 10B:
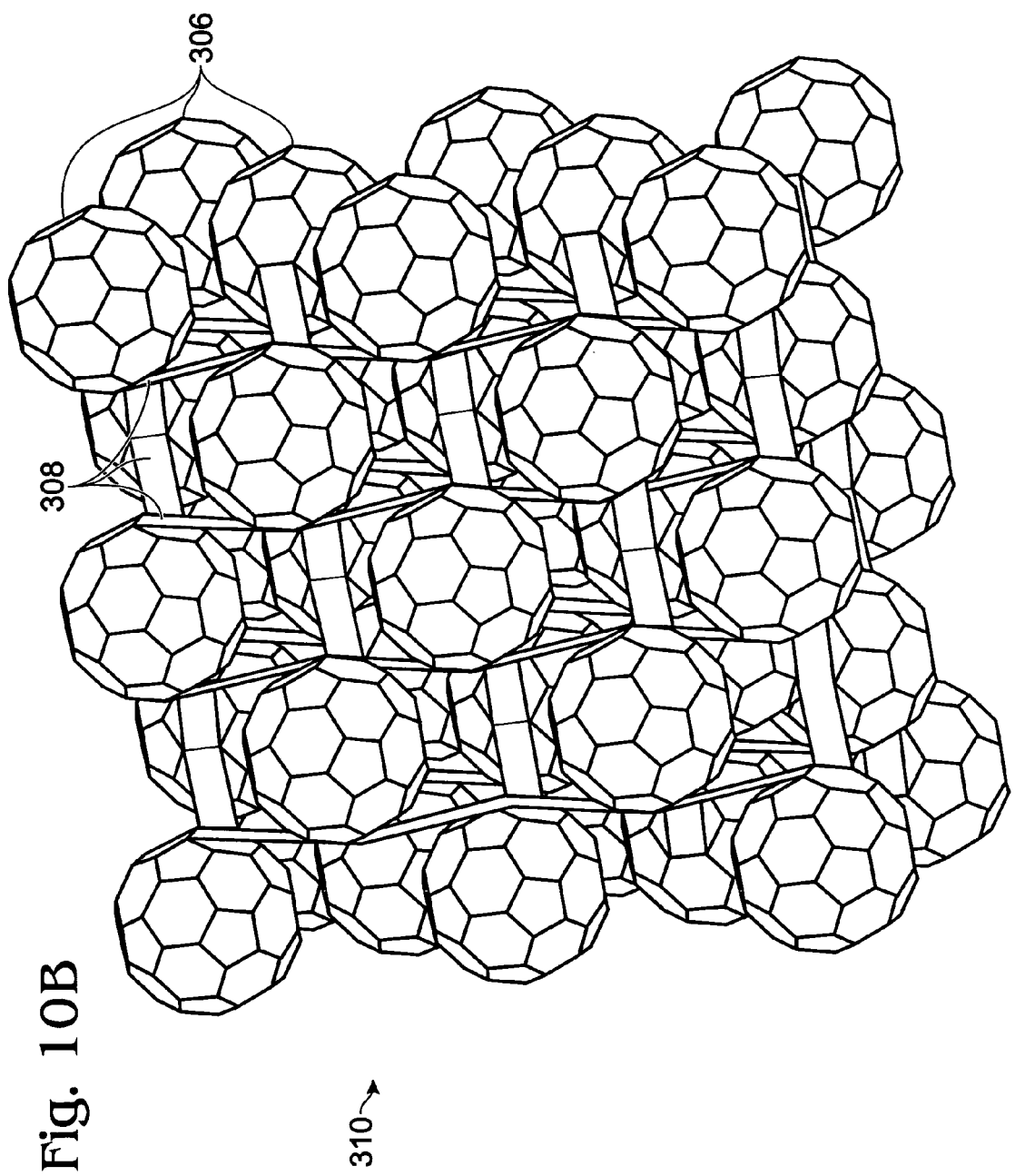
FIG. 10B is a perspective view of a fourth preferred embodiment of a structural fabric according to the present invention.

Turning to FIGS. 10A and 10B, as previously indicated the icosahedral elements may be truncated icosahedrons. Accordingly, FIG. 10A illustrates a third preferred embodiment in which a plurality of truncated icosahedrons 300 interconnected by filaments 302 in an array 304 to form a tensegrity fabric. Depending on the strength, scale and application of the fabric, the filaments may be, for example, cables, wires, strings or even molecular filaments. One particularly attractive truncated icosahedron to use for nano scale applications is the fullerene, or carbon 60 molecule. These molecules may be arranged by any available mechanism, such as atomic force microscopy, and interconnected by any suitable molecular filament as will be understood by persons skilled in the art of fullerene chemistry. Similarly, FIG. 10B illustrates a fourth preferred embodiment in which a plurality of truncated icosahedrons 306 may be interconnected by ribbons 308 in an array 310 to form a tensegrity fabric. As will also be understood by a person skilled in the art of fullerene chemistry, this fabric may also be based on fullerene truncated icosahedrons.

The structural fabrics described above are "regular" arrays of icosahedral and interconnecting elements, that is, the icosahedral elements and the interconnecting elements recur in the array with a spatial periodicity. However, it should be understood that it is possible to deviate from regularity and still provide a useful structural fabric, such as by omitting a randomly selected icosahedral element, and there may be circumstances where that is desirable. For example, where it is anticipated that the structural fabric may not remain perfectly regular in use, for example, because it may become damaged, it may strengthen the structural fabric to intentionally introduce irregularities by analogy to the methods used to strengthen crystalline materials such as metals.

Figure 11:
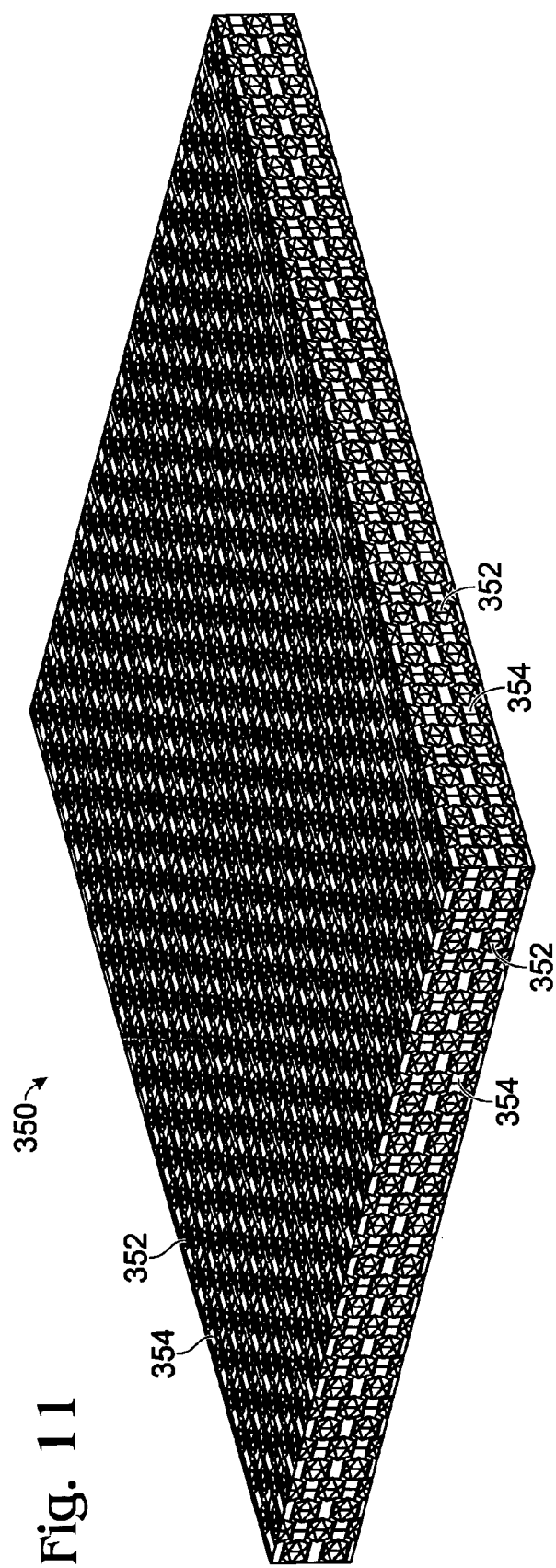
FIG. 11 is a perspective of a plank of fabric according to the present invention.

The icosahedral elements in the embodiments of FIGS. 7A and 7B are regular elements, the edges thereof to which the interconnecting elements are attached are all orthogonal to each other, and the spacing between icosahedral elements is uniform, all of which exploits an advantage of the icosahedral configuration that enables it to provide omni directional expansion with Cartesian symmetry. Alternatively, the icosahedral elements may be semi-regular and interconnected by interconnecting elements attached to corresponding orthogonal faces thereof to provide the same symmetry. An example of a construction material that may be fabricated in accordance with these principles is the bounded sheet, or plank 350, shown in FIG. 11. As can be seen in this figure, the plank comprises an array of icosahedral elements 352 interconnected by ribbons 354.

Figure 13:
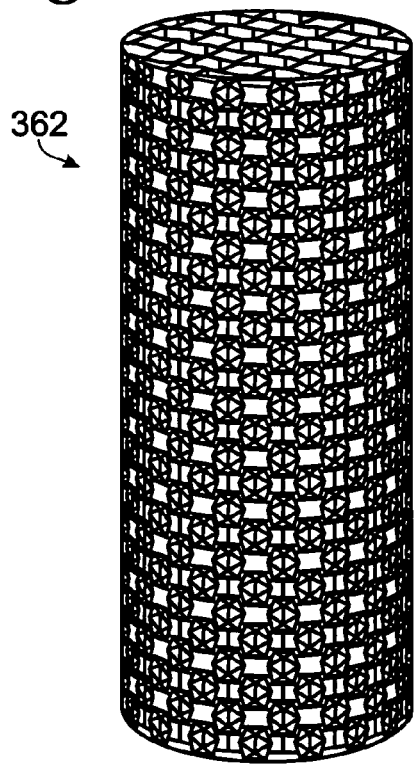
FIG. 13 is a perspective view of a cylindrical form of the present invention.
Figure 14:
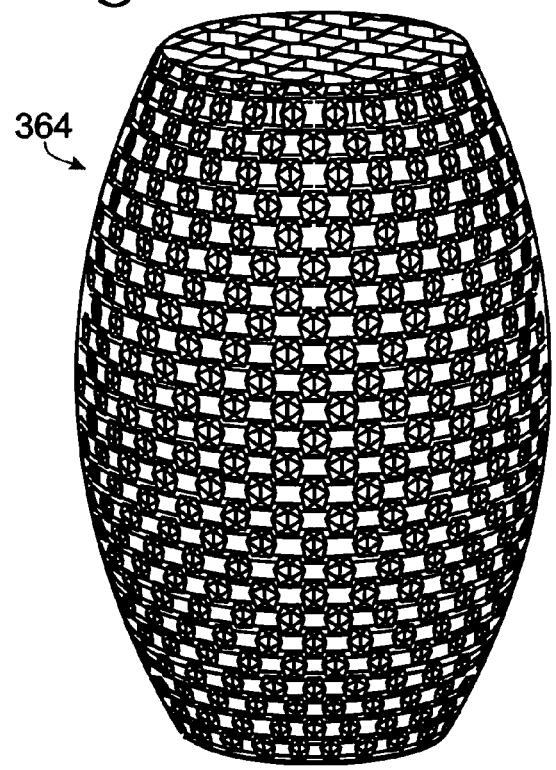
FIG. 14 is a perspective view of a barrel-shaped form of the present invention.

However, the icosahedral elements need not be regular, the spacing need not be uniform, and the lengths of interconnecting segments between two given icosahedral elements need not even be the same to be within the scope of the invention. Indeed, it is another advantage of the icosahedral configuration that, by modifying these features fabrics having various desirable shapes can be created. For example, FIG. 12 shows a non-conformal bounded sheet 360 which forms a wave-like surface. Such a fabric can be fabricated by varying the lengths of the interconnecting element segments between icosahedral elements. FIG. 13 shows a cylindrical structure 362 of similar construction whose shape can be achieved by using irregular icosahedral elements. FIG. 14 shows a barrel shaped structure 364 also of similar construction.

Figure 15:
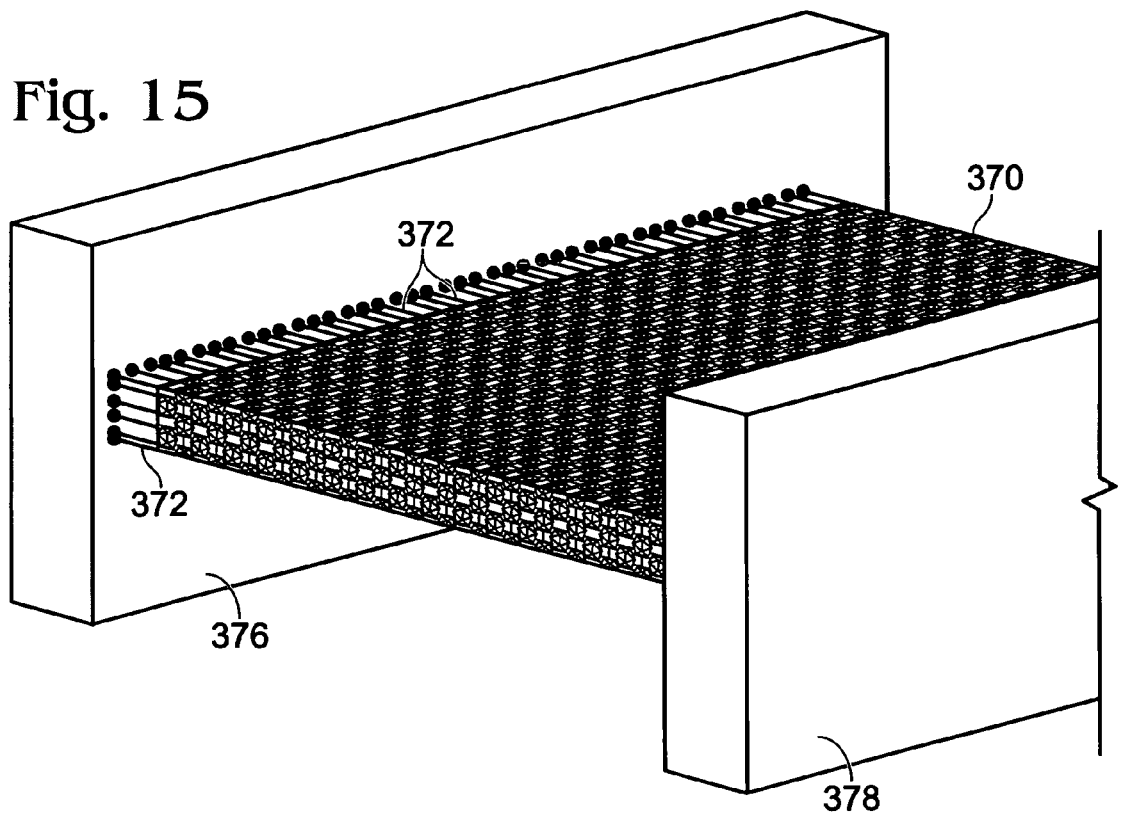
FIG. 15 is a perspective view of a bounded sheet of fabric wherein some of the interconnecting elements thereof are attached at opposite ends to anchoring members so as to maintain tension on the interconnecting members.

In some cases it may desirable to provide external tension to the interconnecting elements of a fabric according to the present invention. Thus, in FIG. 15, a bounded sheet of icosahedral-based tensegrity material 370 has interconnecting members 372 that are attached to respective anchoring members 376 and 378. However, it is to be recognized that other means of anchoring a such a fabric may be used without departing from the principles of the invention, and that the fabric need not be anchored but may be free standing within the scope of the invention.

In general, the icosahedral elements and interconnecting elements may be made of any material suitable for the particular application.

The terms and expressions that have been employed in the foregoing specification are used as terms of description and not of limitation, and are not intended to exclude equivalents of the features shown and described or portions of them. The scope of the invention is defined and limited only by the claims that follow.

The invention claimed is:

1. A structural fabric, comprising:
 a plurality of discrete and spaced apart icosahedral elements;
 a plurality of interconnecting elements, said icosohedral elements being interconnected at selected vertices by said interconnecting elements in tension so as to form a free standing array of said icosahedral elements; and
 wherein for any one interconnected icosahedral element, said interconnecting elements are attached at two consecutive vertices on the interconnected icosahedral element and along an edge on the icosahedral element extending between the two consecutive vertices.

2. The structural fabric of claim 1, wherein a first interconnecting element extends, on average, along a first Cartesian axis, and wherein a second interconnecting element extends, on average, along a second Cartesian axis.

3. The structural fabric of claim 2, wherein a third interconnecting element extends, on average, along a third Cartesian axis.

4. The structural fabric of claim 3, wherein said interconnecting elements are connected to respective sets of said icosahedral elements so that each of the interconnecting elements follows a path that oscillates about one of the respective Cartesian axes.

5. The structural fabric of claim 3, wherein said interconnecting elements are connected to respective sets of said icosahedral elements so that alternate icosahedral elements of said respective sets of icosahedral elements overlap, in opposite directions, respective Cartesian planes in which said respective Cartesian axes lie.

6. The structural fabric of claim 1, wherein said icosahedral elements are regular icosahedrons.

7. The structural fabric of claim 1, wherein said icosahedral elements are truncated regular icosahedrons.

8. The structural fabric of claim 1, wherein said icosahedral elements comprise elongate members connected together so as to form the edges of the icosahedral elements, said elongate members being relatively rigid compared to said interconnecting elements.

9. The structural fabric of claim 1, wherein said icosahedral elements are relatively rigid compared to said interconnecting elements.

10. The structural fabric of claim 1, wherein at least one interconnecting element is connected to a set of said icosahedral elements so as to follow a path that oscillates about an average linear direction.

11. The structural fabric of claim 1, wherein at least one interconnecting element is connected to a set of said icosahedral elements so as to extend, on average, along a plane, and alternate icosahedral elements of said set of icosahedral elements in a direction along said plane overlap said plane in opposite directions.

12. The structural fabric of claim 1, wherein said interconnecting elements comprise filaments.

13. The structural fabric of claim 1, wherein said interconnecting elements comprise ribbons.

14. The structural fabric of claim 1, wherein said array is substantially regular.

15. The structural fabric of claim 14, wherein said icosahedral elements are regular icosahedrons.

16. The structural fabric of claim 14, wherein said icosahedral elements are truncated regular icosahedrons.

17. The structural fabric of claim 14, wherein a first interconnecting element extends, on average, along a first Cartesian axis, a second interconnecting element extends, on average, along a second Cartesian axis, and a third interconnecting element extends, on average, along a third Cartesian axis.

18. The structural fabric of claim 17, wherein said interconnecting elements are connected to respective sets of said icosahedral elements so that each of the interconnecting elements follows a path that oscillates about one of the respective Cartesian axes.

19. The structural fabric of claim 18, wherein said icosahedral elements comprise elongate members connected so as to form the edges of said icosahedral elements, said elongate members being relatively rigid compared to said interconnecting elements.

20. The structural fabric of claim 18, wherein said icosahedral elements are relatively rigid compared to said interconnecting elements.

21. The structural fabric of claim 18, wherein said interconnecting elements comprise filaments.

22. The structural fabric of claim 18, wherein said interconnecting elements comprise ribbons.

23. The structural fabric of claim 17, wherein said interconnecting elements are connected to respective sets of said icosahedral elements so that alternate icosahedral elements of said respective sets of icosahedral elements overlap, in opposite directions, respective Cartesian planes in which said respective Cartesian axes lie.

24. The structural fabric of claim 23, wherein said icosahedral elements comprise elongate members connected so as to form- the edges of said icosahedral elements, said elongate members being relatively rigid compared to said interconnecting elements.

25. The structural fabric of claim 23, wherein said icosahedral elements are relatively rigid compared to said interconnecting elements.

26. The structural fabric of claim 23, wherein said interconnecting elements comprise filaments.

27. The structural fabric of claim 23, wherein said interconnecting elements comprise ribbons.

28. The structural fabric of claim 1, wherein the interconnecting elements alone at least two opposite edges of said structural fabric are attached to respective anchoring members.

29. The structural fabric of claim 1, wherein said icosahedral elements comprise fullerenes.

30. The structural fabric of claim 1, wherein a first interconnecting element extends, on average, along a first Cartesian axis, a second interconnecting element extends, on average, along a second Cartesian axis, and a third interconnecting element extends, on average, along a third Cartesian axis, the extent of the fabric along one of said Cartesian axes being less than along the other two Cartesian axes so that the fabric forms a sheet.

31. The structural fabric of claim 1, wherein the lengths of sections of said interconnecting members between icosahedral elements are varied so that said fabric curves in a predetermined manner.

32. The structural fabric of claim 31, wherein the fabric forms a cylindrical body.

33. The structural fabric of claim 31, wherein the fabric form a barrel-shaped body.

34. A method for constructing a structural fabric, comprising:
  providing a plurality of discrete and spaced apart icosahedral elements; and
  interconnecting said icosohedral elements at selected vertices by a plurality of interconnecting elements in tension so as to form a free standing array of said icosahedral elements, wherein for any one interconnected icosahedral element, said interconnecting further comprises interconnecting said interconnecting elements at two consecutive vertices on the interconnected icosahedral element and along an edge extending between the two consecutive vertices.

35. The method of claim 34, wherein said interconnecting comprises interconnecting a first interconnecting element so that it extends, on average, along a first Cartesian axis, and interconnecting a second interconnecting element so that it extends, on average, along a second Cartesian axis.

36. The method of claim 35, wherein said interconnecting further comprises interconnecting a third interconnecting element so that it extends, on average, along a third Cartesian axis.

37. The method of claim 36, wherein said interconnecting further comprises interconnecting said interconnecting elements to respective sets of said icosahedral elements so as to follow a path that oscillates about their respective Cartesian axes.

38. The method of claim 36, wherein said interconnecting further comprises interconnecting said interconnecting elements to respective sets of said icosahedral elements so that alternate icosahedral elements of said respective sets of icosahedral elements overlap, in opposite directions, respective Cartesian planes in which said respective Cartesian axes lie.

39. The method of claim 34, wherein said providing icosahedral elements comprises providing regular icosahedrons.

40. The method of claim 34, wherein said providing icosahedral elements comprises providing truncated regular icosahedrons.

41. The method of claim 34, wherein said providing icosahedral elements comprises providing icosahedral elements that are relatively rigid compared to said interconnecting elements.

42. The method of claim 34, wherein said interconnecting further comprises interconnecting at least one interconnecting element to a set of said icosahedral elements so as to follow a path that oscillates about an average linear direction.

43. The method of claim 34, wherein said interconnecting further comprises interconnecting at least one interconnecting element to a set of said icosahedral elements so as to extend, on average, along a plane, and alternate icosahedral elements of said set of icosahedral elements in a direction along said plane overlap said plane in opposite directions.

44. The method of claim 34, wherein said interconnecting comprises interconnecting said icosahedral elements with filaments.

45. The method of claim 34, wherein said interconnecting further comprises interconnecting said icosahedral elements with ribbons.

* * * * *

UNITED STATES PATENT AND TRADEMARK OFFICE
CERTIFICATE OF CORRECTION

| | |
|---|---|
| PATENT NO. | : 7,452,578 B2 |
| APPLICATION NO. | : 10/932403 |
| DATED | : November 18, 2008 |
| INVENTOR(S) | : Samuel J. Lanahan |

Page 1 of 1

It is certified that error appears in the above-identified patent and that said Letters Patent is hereby corrected as shown below:

<u>Title page, item [57] in the Abstract:</u>
    Line 3 of the Abstract, "icosahedra elements" should read --icosahedral elements--.

Column 2, line 6, "compression-elements," should read --compression elements,--.

Column 3, line 1, "icosohedral elements" should read --icosahedral elements--.

Column 3, lines 8-9, "icoshadrons, particularly" should read --icosahedrons, particularly--.

Column 5, line 4, "an octahedron 8," should read --an octahedron 6--.

Column 5, line 7, "the icosahedron 12" should read --the icosahedron 2--.

Column 5, line 13, "shown in FIG. 3. in" should read --shown in FIG. 3 in--.

Column 6, line 34, "departing form the" should read --departing from the--.

Column 6, line 59, "preferred embodiment. 174," should read --preferred embodiment 174,--.

Column 7, line 50, "icosohedral elements" should read --icosahedral elements--.

Column 8, line 65, "it may desirable" should read --it may be desirable--.

Column 9, line 4, "a such a fabric" should read --such a fabric--.

Column 9, line 21, "said icosohedral" should read --said icosahedral--.

Column 10, line 45, "form- the edges" should read --form the edges--.

Column 10, line 56, "elements alone" should read --elements along--.

Column 11, line 10, "form a" should read --forms a--.

Column 11, line 15, "said icosohedral" should read --said icosahedral--.

Signed and Sealed this

Sixteenth Day of March, 2010

David J. Kappos
*Director of the United States Patent and Trademark Office*